Dec. 16, 1952  A. A. GRADISAR  2,621,559
COLUMN SUPPORTING AND ELEVATING STRUCTURE FOR OPTICAL INSTRUMENTS
Filed June 21, 1949
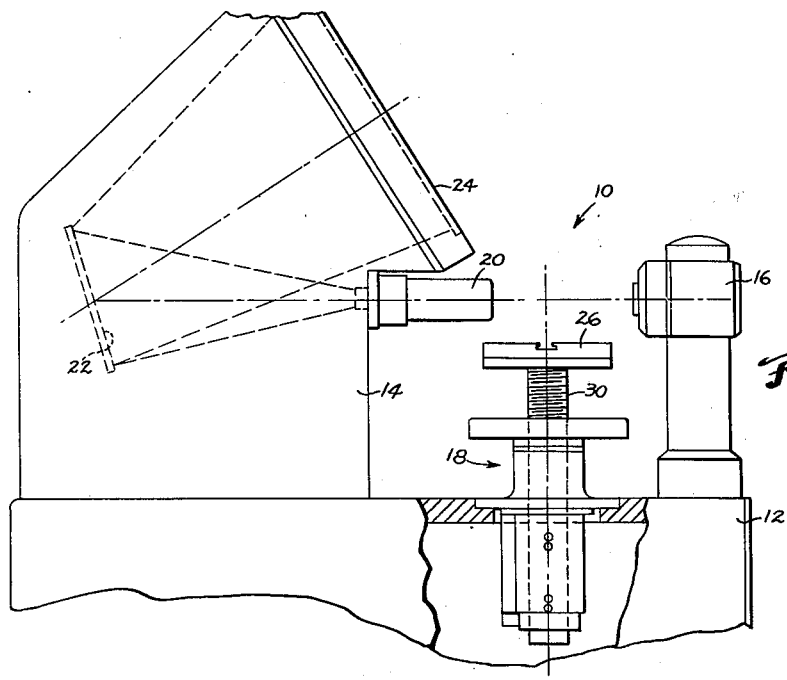
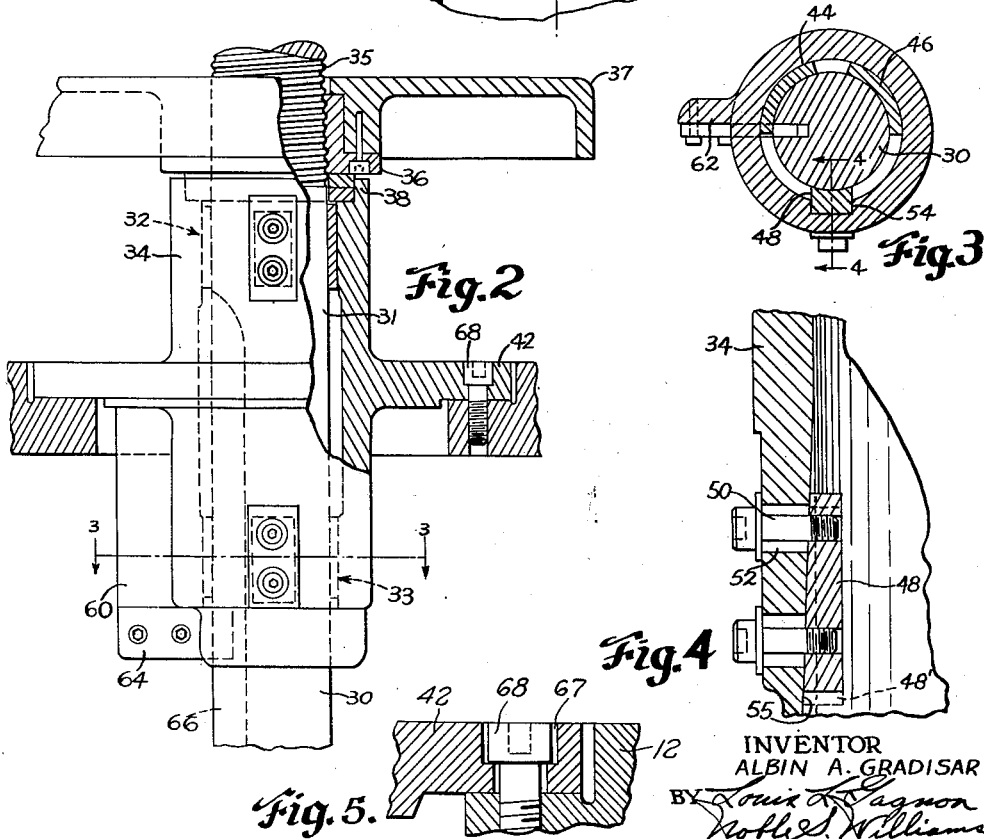
INVENTOR
ALBIN A. GRADISAR
BY
ATTORNEYS Patented Dec. 16, 1952

2,621,559

UNITED STATES PATENT OFFICE 2,621,559

COLUMN SUPPORTING AND ELEVATING STRUCTURE FOR OPTICAL INSTRUMENTS

Albin A. Gradisar, Snyder, N. Y., assignor to American Optical Company, Southbridge, Mass., a voluntary association of Massachusetts Application June 21, 1949, Serial No. 100,427

1 Claim. (Cl. 88—24)

This invention relates to means for supporting an elongated column, shaft or the like for axial adjustment relative to the instrument or structure in which it is employed during the use of the instrument and while maintaining the accurate alignment of said column or shaft.

A particular application of the invention would be in an optical instrument such as a contour projector wherein one is often desirous of changing the level of a work-supporting table thereof relative to the axis of an optical system carried by the instrument without apparent lateral displacement of the image of the workpiece on the viewing screen also carried thereby. It is also an object of the invention to provide in such a structure an arrangement of parts which may be easily, economically and accurately formed and assembled and which will be of a sturdy and durable construction for maintaining their accuracy over long periods of use of the device.

A more complete understanding of the invention will be had from the detailed description which follows when taken in conjunction with the accompanying drawing, in which:

Fig. 1 is a side elevational view of a contour projector, parts of the structure being broken away to show details thereof;

Fig. 2 is an enlarged side elevational view of the work supporting and elevating structure of Fig. 1;

Fig. 3 is a cross sectional view taken substantially on line 3—3 of Fig. 2 and looking in the direction of the arrows;

Fig. 4 is a sectional view taken substantially along the lines 4—4 of Fig. 3 and looking in the direction of the arrows; and, Fig. 5 is an enlarged fragmentary view of a portion of Fig. 2.

In Fig. 1 of the drawing, there is shown a contour projector 10 comprising a main supporting base 12 upon which is mounted an enclosed shadow box 14, a lamp housing 16 and a work-supporting and elevating structure 18. In the normal use of such an optical instrument an object, such as a precision machine tool, would be supported on V-blocks or the like upon the work-supporting and elevating structure in a manner to be positioned in a collimated beam of light from the lamp housing 16 and directed toward an objective 20 which is optically aligned with the lamp housing and with a reflecting mirror 22 within the shadow box so that a greatly enlarged image of the contour of a portion of the tool or workpiece will be reproduced upon a translucent viewing screen 24 carried in an upper wall of the shadow box. It will be obvious that in such a precision optical instrument very close tolerances must be held in the manufacture of various parts thereof. For example in the contour projector 10, it is desirable to have the work-supporting and elevating structure move vertically through an appropriate distance for properly locating any selected edge portion of an object carried upon a work-supporting stage 26 thereof at a proper location to be aligned with and imaged by the objective on the viewing screen 24. No matter to what location the stage or work table is moved, the parts of the elevating structure should move smoothly and freely, and still substantially no play or slack or lost motion should occur therein.

The work table 26 in the present disclosure is supported by a vertically movable column 30 having a highly accurately finished cylindrical exterior surface 31 of considerable length to accommodate such vertical displacement. This external surface 31 is arranged to slide up and down in upper and lower support means 32 and 33 carried in the hollow housing 34 of the elevating structure 18. The support means engage the column at locations separated appreciably vertically from each other to provide good stability for the column against any lateral displacement thereof. The upper end of the column, furthermore, is provided with coarse but accurately formed threads 35 which are engaged by a threaded part 36 secured to a rotatable manually operable control wheel 37. The parts 36 and 37 rest upon bearing rings or the like 38 engaging upper end portions of the hollow housing 34 which has an integral outwardly extending peripheral flange 42 by which it may be bolted or otherwise secured to the rigid base 12 of the contour projector.

A great deal of difficulty has been encountered, in actual practice, when it was attempted to accurately form a cylindrical shaft or column and an internal bore or guide way for such shaft or column in the housing intended for supporting and guiding same. When the column and the interior surface of the housing were ground and polished for fitting together the close tolerances desired from end to end thereof could not always be maintained without considerable skill and time. Any small amounts of error occurring in such parts might cause binding during vertical adjustment or might be apparent upon the viewing screen of such an instrument as lateral movement or play particularly when an objective of relatively high magnification was being employed. The present invention, however, has overcome to a large extent the manufacturing difficulties of earlier constructions by providing in the housing 34, in place of an accurately formed internal bore throughout substantially the entire length of the member, the support means 32 near the upper end of the housing and similar support means 33 near the lower end of the housing each of which comprises a set of inwardly extending bearing projections of novel construction.

Each set of bearing projections, as will be apparent from inspection of Figs. 2 and 3, comprises projections 44 and 46 which are fixedly secured, such as by brazing, welding or the like, to the interior surface of the hollow housing 34 at approximately 120° apart and with respect to a third projection 48 which support column 30 therebetween. The projection 48, however, is movably carried by the housing 34 and, after same has been properly fitted and adjusted into its proper position in the assembled structure, it may be clamped in a fixed position by a pair of bolts 50, or like means, extending through vertically elongated openings 52 in the housing 34 and threaded into holes in the movable projection 48.

The movable projection is in the present preferred construction arranged to fit into an accurately formed recess 54 in the interior wall of the housing 34 and the inner surface or bottom 55 of this recess is accurately finished so as to provide a flat sloping surface disposed at an acute angle of not more than a few degrees with reference to the longitudinal axis of the column. The projection 48, it will be seen from Fig. 4, is likewise provided with a flat outer or complementary surface likewise disposed at the same acute angle to the longitudinal axis of the column. Thus the movable projection is shaped so as to form what might be termed a wedge-shaped bearing. All three projections have their inner bearing surfaces transversely curved for engagement with substantial areas of the surface 31 on the column 30. It will be appreciated that the support means 32 in the upper part of the housing 34 is substantially the same as the support means 33 in the upper part, the only material difference being that the recess in the upper part of housing 34 and the movable projection will be in a reversed position for ease of insertion and adjustment.

From Figs. 2 and 3, it will also be appreciated that the housing 34 has been provided with a laterally and downwardly extending integral flange 60 and to a lower machined surface portion 62 of which may be bolted or otherwise secured a key 64. This key has its inner end extending into a longitudinally extending and radially disposed keyway 66 in the column 30. This construction accordingly allows column 30 to be adjusted vertically throughout its entire normal range of adjustment while being restrained from any appreciable rotational movement which might otherwise result due to the operation of the hand wheel 37. It might be desirable, however, to arrange the stage or work table 26 so that it could be accurately rotated about the longitudinal axis of the column 30, since this axis will be normally arranged to accurately intersect the optical axis of the objective 20. Such an arrangement may be readily accomplished in the preferred construction shown by providing slightly oversized openings 67 in the flange 42 of the housing 34 and by carefully adjusting the elevating assembly laterally before the several securing bolts 68 extending through the flange are tightened. Obviously when such rotation of the stage 26 is desirable, a rotatable member might be journaled about the lower end of the housing 34 and have the outer end of the key 64 bolted thereto. Thus if such a rotatable member were provided with a rigid lever arm as a handle, measured degrees of rotation of the stage and work thereon from a zero or index mark could be indicated by this handle regardless of the particular elevation at which the stage might be located.

It has been found advantageous in the production of the supporting and elevating structure just described to clamp the movable projections 48 in the housing 34 with each adjusted to or nearly to its outermost position, such as indicated at 48' in Fig. 4 for the lower wedge member 48. All of the sets of projections of the upper and the lower support means are then machined or reamed to a diameter equal to or only slightly greater than the finished exterior bearing surface of the column 30. A fine grinding or polishing step might also be employed for finishing the bearing surfaces on these projections at such time. It is then desirable to remove the movable projections from the housing 34 and the housing from the supporting base 12 and place it in a horizontal position with the fixed bearing 44 and 46 of the upper and lower set, which are longitudinally aligned, respectively, disposed downwardly to thus provide a V-way upon which the column 30 may be placed.

Before the column 30 is so positioned upon the bearings 44 and 46, the exterior bearing surfaces of the column 30 are coated with a bluing so that when the column 30 is placed upon the projections 44 and 46 and moved back and forth a few times as it would be moved through its normal range of adjustment in the instrument (and rotated if it is to be of a rotatable construction), it may then be readily ascertained just what portions of each of these fixed projections are actually coming in contact with the column. In practice, it has been found desirable to provide projections which present relatively small bearing areas so that the amount of internal grinding and finishing required will be kept to a minimum. However, adequate bearing areas are provided so that no appreciable wear will disturb the accuracy of the instrument over a long period of normal use thereof. For example, four times the minimum area required may be provided each projection. Then from the indications obtained by the bluing upon the bearing areas from the sliding of the column it can be ascertained how much of each area is in use. A hand honing or fitting operation may then be employed to rub down any part of any bearing projection if there is need to increase the size of the areas contacted by the surface 31 of the column, that is at least until the allowable minimum, such as 25 per cent of the total area, has been obtained. While this hand fitted operation can be readily repeated several times if necessary and until acceptable results have been obtained, it is nevertheless an easy operation for a person skilled in such work and requires only a small amount of time to perform.

After the fixed projections have been properly fitted to provide the required minimum bearing area, the movable projections may have their interior bearing surfaces likewise accurately finished by again bluing the column 30, placing it upon the projections 44 and 46 and then carefully fitting the movable projections 48 into their respective recesses 54 and moving the projections 48 into snug engagement with the blued surface 31 of the column 30. Thereafter, the column may be again moved back and forth several times through its normal range of adjustment (and rotated if it is to be of a rotatable construction) and when the projections are removed and inspected, it may be ascertained whether or not adequate bearing areas are being provided the column thereby. If the acceptable minimum has not been obtained, each projection 48 may be hand finished and again inserted into the housing, secured and tested. Obviously the method could be reversed, if desired, by placing the bluing directly upon the fixed projections, testing for the amount of contact and thereafter placing bluing upon the movable projections and testing for the amount of contact thereof. However, the former procedure is preferred since it is a little easier to merely rub the blue "high spots" and still obtain highly accurate results.

It will be appreciated that not only is a construction provided by the present invention which is of a more economical construction since a lesser amount of accurate finishing of surfaces is required but also a more highly accurate fitted condition can be obtained by the use of these fixed and adjustable bearing surfaces which are located at widely spaced locations axially along the column. Thus there is provided a column supporting and elevating structure which is of high precision and one which will maintain such precision over long periods of normal use. Furthermore, it is a very simple operation, should any wear occur in the parts, to merely loosen the clamping bolts 50 for either or both of the movable projections 48 and to move or tap these projections inwardly slightly to remove any looseness in the assembly. Of course any such wear in the parts and readjustment of the movable projections will advantageously provide new bearing areas of greater size than provided originally.

Having described my invention, I claim:

In an optical instrument having a supporting base and an optical system including an objective thereon with the optical axis of said objective disposed at a predetermined location relative to said base, the combination of a stage for supporting objects at an object plane of said objective, an elevating and guiding structure for said stage, said structure comprising a rigid housing having upper and lower column guiding means carried in vertically spaced relation thereby, each column guiding means comprising a pair of fixed inwardly extending projections and a movable inwardly extending projection, with each fixed projection of said upper guiding means being vertically aligned with a fixed projection of said lower guiding means, and with the movable projection of said upper guiding means being vertically aligned with the movable projection of said lower guiding means, an elongated column positioned in said upper and lower guiding means for longitudinal sliding movement therein, said column having accurately formed cylindrical bearing surface portions thereon for effecting true straight line motion of said column, the projections of each guiding means having inner bearing surfaces formed thereon which extend in longitudinal parallel relation to the bearing surface portions on said column, said movable projections being longitudinally adjustable relative to said housing, flat interior surfaces upon said housing along which said movable projections may be moved during adjustment thereof, each of said flat surfaces being disposed at an acute angle relative to the longitudinal axis of said column, said movable projections each having a complementary flat surface in engagement with the flat surfaces on said housing, means for securing said movable projections in fixed relation to said housing with the flat surfaces in face-to-face engagement after said movable projections have been moved into engagement with said bearing surface portions on said column, readily operable means engaging said column and a part fixed relative to said housing for causing small increments of axial adjustment of said column relative to said housing, and securing means providing limited lateral movement of said housing relative to said base and for fixedly securing said housing upon said base while the axis of said column intersects the optical axis of said objective.

ALBIN A. GRADISAR.

REFERENCES CITED

The following references are of record in the file of this patent:

UNITED STATES PATENTS

| Number | Name | Date |
| --- | --- | --- |
| 190,048 | Jennings | Apr. 24, 1877 |
| 873,097 | Sauer | Dec. 10, 1907 |
| 2,381,634 | Back | Aug. 7, 1945 |
| 2,493,325 | Stevens | Jan. 3, 1950 |

OTHER REFERENCES

Dykes' Auto Encyclopedia, 14th ed., 1926, page 785. Published by Goodheart-Willcox Co.